Patented July 26, 1949

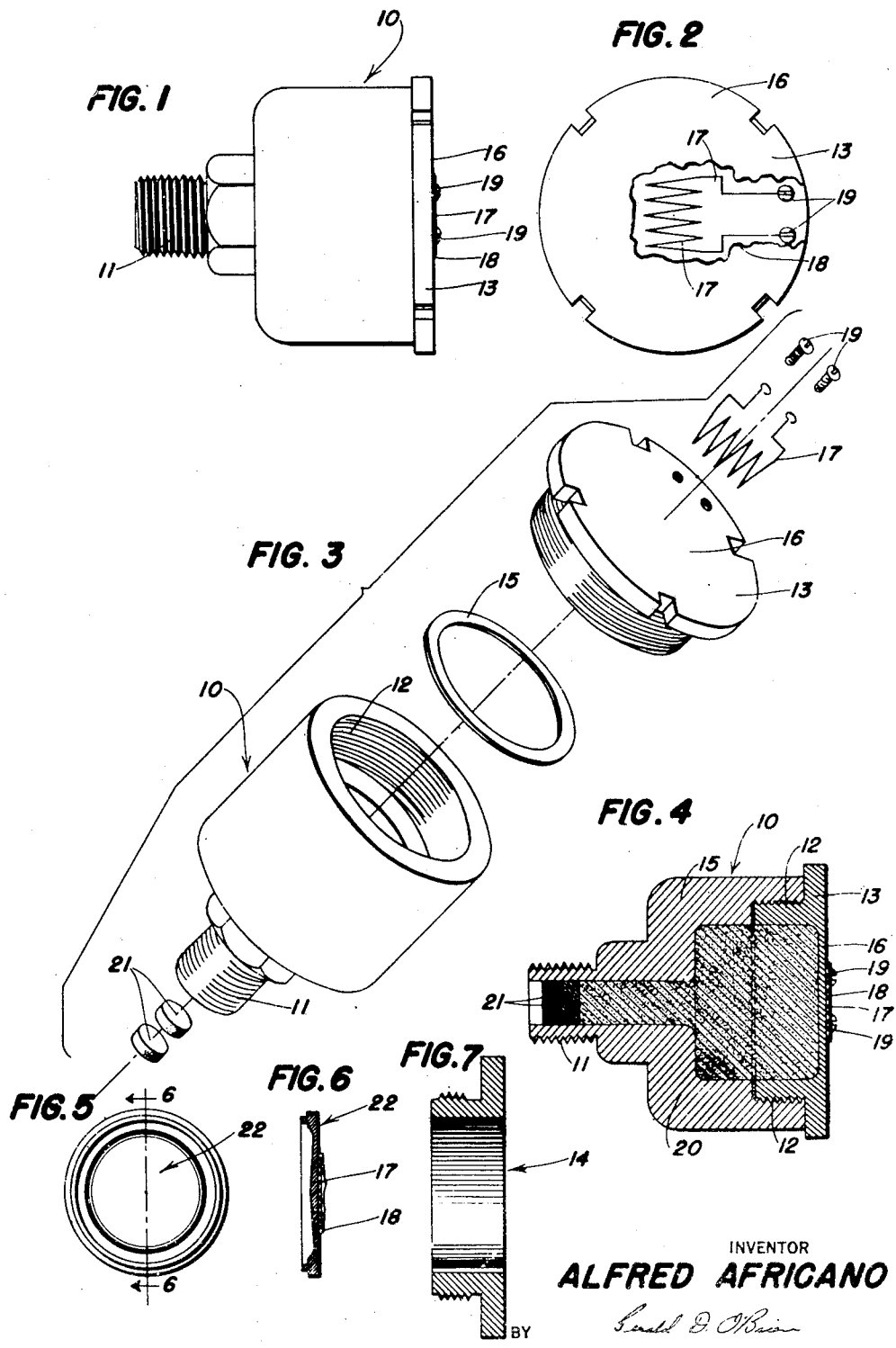

2,477,507

UNITED STATES PATENT OFFICE 2,477,507

ELECTRICAL PRESSURE GAUGE

Alfred Africano, Cumberland, Md., assignor to the United States of America as represented by the Secretary of the Navy Application August 2, 1945, Serial No. 608,596

2 Claims. (Cl. 201—63)

This invention relates generally to pressure gages and more particularly to such gages of the diaphragm strain type for use with electrical indicating apparatus. The improved diaphragm-type pressure strain gage herein disclosed is particularly suitable for use in the testing of rocket propellants and for determining the instantaneous values of fluid pressures developed in rocket launchers by the combustion of rocket propellent materials.

It is an object of this invention to provide an improved and highly sensitive pressure gage for indicating the pressure-time characteristics of rocket propellants.

It is another object of this invention to provide an improved pressure strain gage which possesses a high degree of accuracy in indication over a wide range of applied fluid pressures.

It is also an object of the invention to provide an improved mounting for a diaphragm strain gage.

The specific nature of this invention as well as other objects and advantages thereof will be apparent from the following description of the preferred embodiments illustrated in the accompanying drawings in which:

Fig. 1 is a side elevational view of a preferred embodiment of the invention;

Fig. 2 is a partly diagrammatic end elevational view of the Fig. 1 embodiment;

Fig. 3 is an isometric view of the components of the Fig. 1 embodiment, showing them in position ready for assembly;

Fig. 4 is a longitudinal sectional view of the Fig. 1 strain gage;

Fig. 5 and Fig. 6 are plan and longitudinal sectional views, respectively, of a modified form of diaphragm suitable for use with the mounting cup illustrated in Fig. 3; and Fig. 7 is a sectional view of a clamp member for securing the diaphragm illustrated in Figs. 5 and 6 to the mounting cup illustrated in Fig 3.

A metallic diaphragm mounting cup 10 illustrated in Figs. 1 to 4, inclusive, includes a threaded boss 11 for connection or attachment to a combustion chamber or rocket launcher (not shown) in which it is desired to measure the gas pressures produced by the combustion of propellent materials. The cup is provided with an internal threaded portion 12 adapted to receive a brass mounting ring 13 (illustrated in Fig. 3) or a clamp member 14 (illustrated in Fig. 7). An annular copper gasket 15 is provided as a seal between ring 13 and cup 10. The ring has an integral diaphragm 16, the latter being provided on its outer face with a zig-zag electrical resistance wire 17 appropriately insulated and rigidly secured thereto as by cement 18. The wire 17 may be of the order of 600 ohms in resistance. Appropriate electrical connections such as binding posts 19, 19 are provided at the edge of ring 13. The cup 10 is preferably filled with grease 20, retained in the cup by felt disks 21, 21.

In the modified construction illustrated in Figs. 5, 6 and 7, a separate diaphragm 22 having a non-uniform thickness is provided. As clearly shown in Fig. 6, the diaphragm has an outer annular section of reduced thickness for the purpose of permitting a higher average tension in the central area where the resistance wire 17 is mounted. Such a diaphragm is found to be more sensitive over a wider range of pressures than is the uniform-thickness integral diaphragm 16 illustrated in Fig. 4. When the Fig. 6 diaphragm is employed, it is secured within cup 10 by clamping member 14.

In operation, the boss 11 of cup 10 is connected to the combustion chamber or rocket launcher chamber or any other chamber in which it is desired to measure internal fluid pressures. The terminals 19 are connected to any suitable indicating apparatus, such as an electrical bridge circuit adapted to be unbalanced by a change of resistance of wire 17 and to apply an output signal to the vertical beam-deflecting plate of a cathode ray tube included in an oscilloscope (not shown). A suitable linear time-base sweep voltage may be applied to the horizontal beam deflecting plates (not shown). Variations in pressure due to combustion are communicated from the combustion chamber through felt disks 21, 21 and grease 20 in cup 10 to the diaphragm 16 or 22, depending upon the form of diaphragm employed. Pressure variations flex the diaphragm and accordingly vary the tension upon the resistance wire by virtue of the fact that it is intimately cemented to the diaphragm throughout its length. The strains thus imposed are within the elastic limit of the resistance material, even when heated, and the incident variations of its length and cross-sectional conductor area vary its electrical resistance, and accordingly unbalance the bridge electrical circuit, causing signals functionally related to fluid pressure to be transmitted to the indicating device. The strain gage and indicating apparatus may be empirically calibrated by the application of known pressures to the gage, so that comparative standards may be obtained. By the use of such a linear time-base indicating device, pressure may be plotted against time. The provision of felt disks 21, 21 and grease 20 within cup 10 prevents hot combustion gases from contacting the diaphragm.

While there have been shown and described what are at present considered to be the preferred embodiments of the invention, it will be obvious to those skilled in the art that various changes and modifications may be made therein without departing from the true scope of the invention, and it is, accordingly, aimed in the appended claims, to cover all such changes and modifications as fall within the true spirit of the present invention and without the scope of the prior art.

I claim:

1. A gage for measuring pressure including a member provided with a passageway therethrough, a portion of the passageway being enlarged to form a chamber, both portions being packed with an animal fat, a diaphragm closing the chamber end of the passageway and being contacted by the animal fat, at least one washer in the other end of the passageway serving as a fat retainer, means for connecting said member to a source of pressure, and an electrical element fixed to and whose impedance characteristic is varied by distortion of the diaphragm whereby said characteristic serves as an indication of said pressure.

2. A gage in accordance with claim 1 in which the diaphragm has an outer annular section of decreased thickness increasing to a greater thickness towards the center of the diaphragm.

ALFRED AFRICANO.

REFERENCES CITED

The following references are of record in the file of this patent:

UNITED STATES PATENTS

| Number | Name | Date |
| --- | --- | --- |
| 2,336,500 | Osterberg | Dec. 14, 1943 |
| 2,365,015 | Simmons | Dec. 12, 1944 |
| 2,391,966 | Harrison | Jan. 1, 1946 |
| 2,398,372 | Green | Apr. 16, 1946 |
| 2,400,467 | Ruge | May 14, 1946 |
| 2,405,199 | Faust et al. | Aug. 6, 1946 |